Sept. 5, 1939. A. S. LEVIN 2,172,104
AGITATING, ADVERTISING, AND DISPENSING DEVICE
Filed May 4, 1937 2 Sheets-Sheet 1
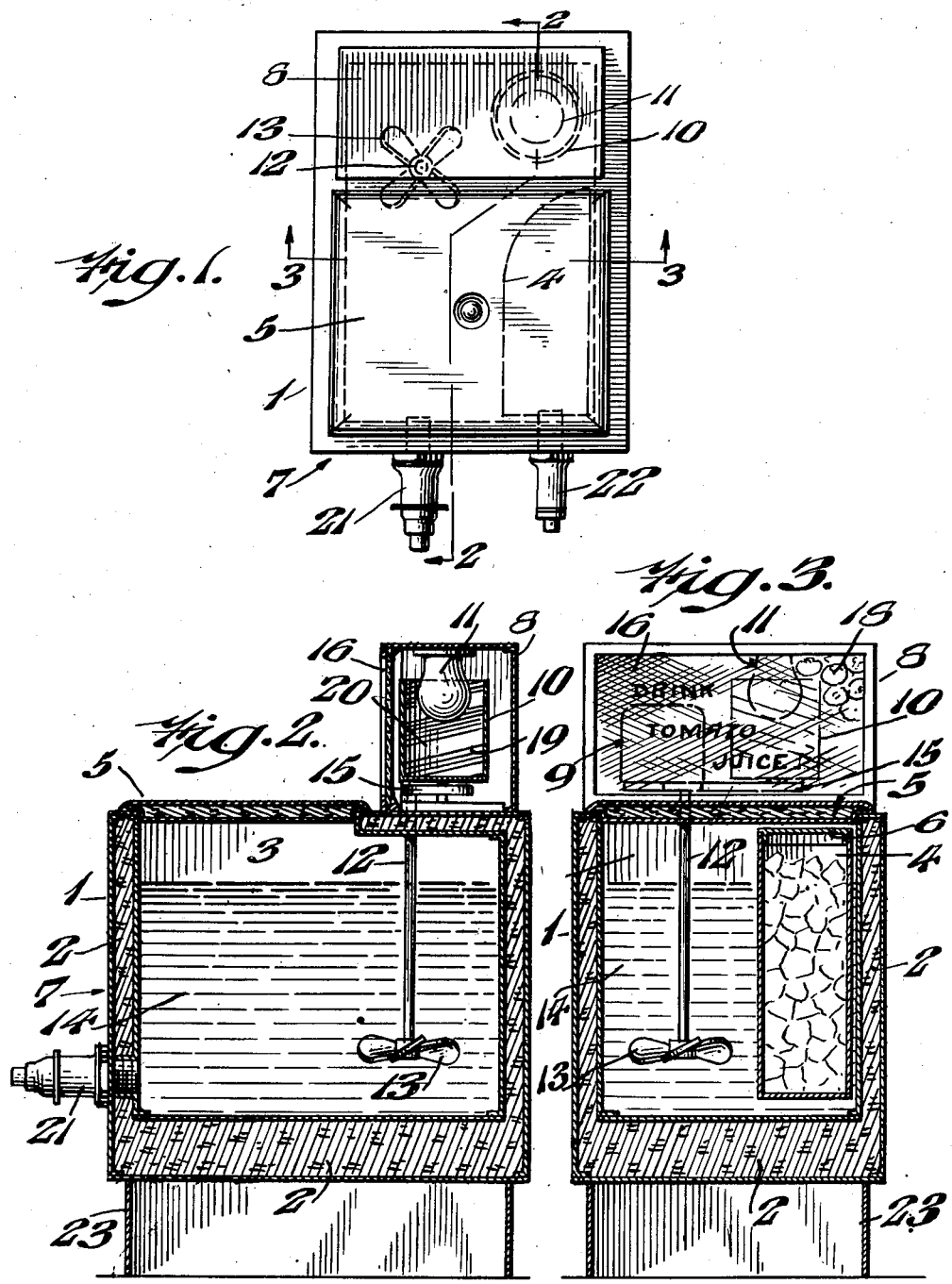
INVENTOR
ABRAHAM S. LEVIN
BY
Louis Necho
ATTORNEY

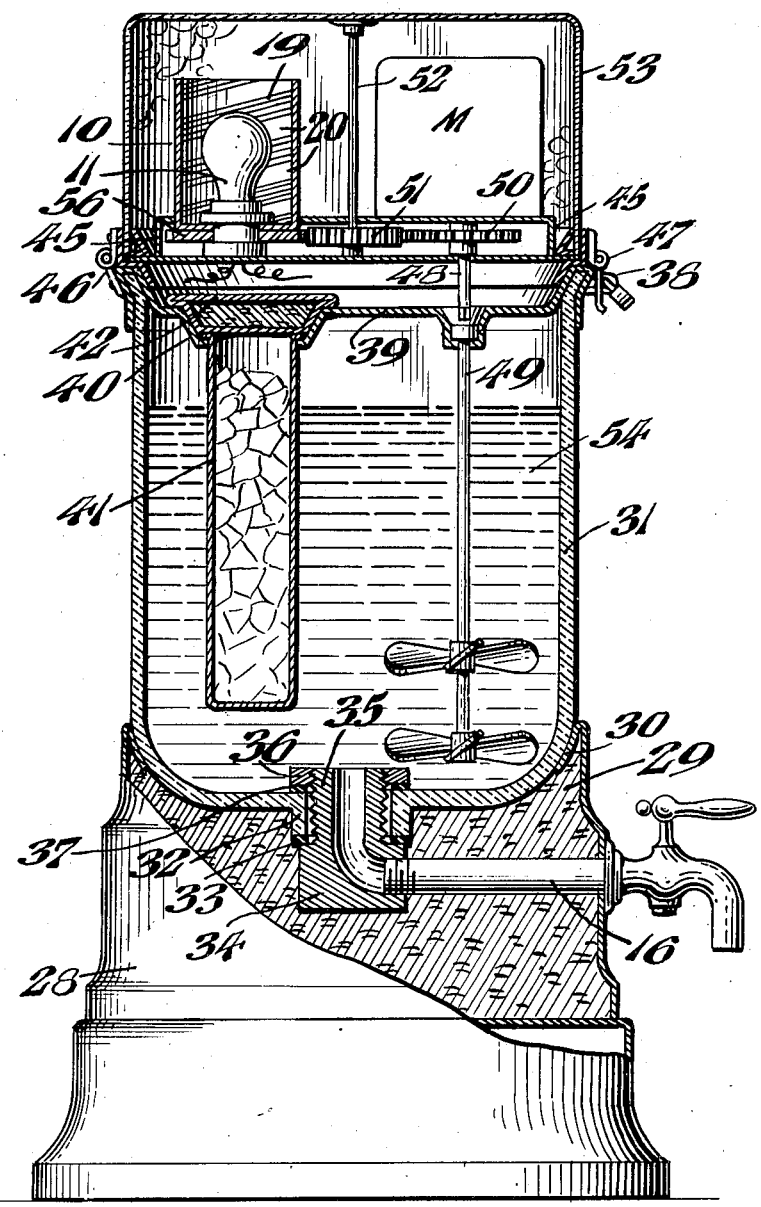

Patented Sept. 5, 1939

2,172,104

UNITED STATES PATENT OFFICE 2,172,104

AGITATING, ADVERTISING, AND DISPENSING DEVICE

Abraham S. Levin, Philadelphia, Pa.

Application May 4, 1937, Serial No. 140,601

1 Claim. (Cl. 225—21)

My invention relates to a new and useful agitating, advertising and dispensing device and more particularly to a device adapted for dispensing various beverages such as fruit juices and the like where it is desirable or necessary to keep the beverage in a state of constant agitation to insure a uniform consistency of the beverage dispensed by preventing precipitation and separation.

My invention further relates to a device of this character in which provision is made for refrigerating the beverage being dispensed and for presenting an animated pictorial representation for advertising the nature of the beverage being dispensed.

My invention further relates to a device of this character which has maximum capacity consistent with a relatively small and compact design which will lend itself to use on a bar, a soda fountain and similar places.

In the accompanying drawings:

Fig. 1 represents a plan view of a dispensing device embodying my invention.

Fig. 2 represents a section on line 2—2 of Fig. 1.

Fig. 3 represents a section on line 3—3 of Fig. 1.

Fig. 4 represents a view, partly in vertical section and partly in elevation showing a modified form of construction.

Referring to the drawings in which like characters indicate like parts, 1 designates a casing which is of any suitable size and shape and which is preferably provided with an attractive exterior appearance. The casing 1 is also preferably made of a double wall construction and suitably insulated as at 2. The inside of the casing 1 is divided into a relatively large compartment 3 for containing the juice to be dispensed and a smaller compartment 4 for receiving cracked ice or other suitable refrigerant. Access to the compartments 3 may be had by removing or raising the removable cover 5, and the compartment 4 is also provided with its own inner cover 6. Set back from the front edge 7 of the container is the casing 8 which houses the motor 9 and the animated advertising device 10 into which projects the electric light 11 energized from any desirable source. The motor 9 actuates the shaft 12 which is provided with the propeller blades 13 for agitating the beverage 14. The motor 9 also actuates the shaft 15 which rotates the advertising device 10 around the lamp 11. The front wall 16 of the casing 8 is formed of a translucent material on which is inscribed or otherwise applied the representation 18 of the fruit juice being dispensed, or any other advertising material that relates to the beverage 14. The advertising device 10 consists of a casing, cylindrical or otherwise, in the walls of which are formed the slots or other mutilations 19 so that, when it is rotated by the shaft 15, the slots 19 and the intervening solid portions 20 will cast varying shadows and lights to illuminate or darken or otherwise affect the visibility of the representation 18. 21 represents a spigot through which the beverage 14 may be dispensed, and 22 represents another spigot through which the contents of the compartment 4, such as melted ice or the like, may be drained. The entire casing 1, if desired, may be mounted on suitable legs 23.

In operation the fruit juice or other beverage is introduced into the casing 1 by raising the cover 5, and, by raising the cover 6, ice or other refrgerants may be admitted into the container 4. A switch (not shown) is then turned on to energize the motor 9, and the lamp 11. The constant agitation of the beverage prevents the separation of the pulp from the juice as in orange juice or tomato juice or the like and helps to circulate the liquid around the refrigerating compartment to insure uniform temperature, while the rotating advertising device 10 by interrupting the light cast by the lamp 11 against the translucent face 16 calls attention of the nature of the beverage being dispensed. Thus, if the liquid 14 is tomato juice, there will be a representation of tomatoes 18 on the front wall 16 of the casing 8 with or without a slogan or other wording.

In Fig. 4 I have shown a modified form of construction in which I utilize any suitable attractive base 28 which is preferably hollow and filled with insulation 29. The base 28 is provided with a turned-in annular concave flange 30 on which is positioned the glass container 31 which is preferably round and which is provided with the pendent flange 32 seating on the washer 33. The washer 33 sits on the shoulder of the fitting 34 which is provided with a threaded neck 35 which is engaged by the nut 36, there being a washer 37 to cushion the pressure of the nut and prevent damage to the glass container 31. The glass container 31 is provided with a flaring annular flange 38 on which is seated the supporting plate 39. The supporting plate 39 is provided with the pendent flange 40 for supporting the ice or other refrigerant container 41 which is provided with a removable cover 42. 45 designates a supporting plate which is hinged at 46 and which is provided with any suitable locking means 47. On the plate 45 is mounted a motor M which is energized in any suitable manner and which actuates the stub shaft 48. The stub shaft 48 is adapted to engage and rotate the agitator 49. The stub shaft 48 also has the gear 50 which meshes with the gear 51 to turn the shaft 52 and thus rotate the upper casing 53 which is transparent or translucent and which carries any desired advertising or slogan descriptive of the juice 54 to be dispensed. The gear 51 meshes with the gear 56 to rotate the advertising device 10 which is provided with the slots 19 and solid portions 20 which interrupt the light shed by the lamp 11. The gear 56 is preferably provided with an opening through which the socket of the lamp 11 may project so that the lamp may remain stationary while the advertising device 10 rotates. When it is desired to replenish the contents of the juice container 31, the lock 47 is opened and the casing 53 is raised upon the hinge 46 and the ice or other refrigerant container 41 may be either raised bodily and emptied, or it may be drained through a suitable communicating spigot (not shown) similar to the spigot 22 in Fig. 1. 60 designates a spigot communicating through the threaded fitting 35 with the inside of the container 31 through which the beverage 54 may be dispensed.

Having thus described my invention, what I claim as new and desire to secure by Letters Patent is:

An advertising, dispensing and agitating device comprising, a liquid receptacle adapted to contain the liquid to be dispensed, an inner removable cover for said receptacle, a refrigerant container detachably suspended from said inner cover into said receptacle, a pendant agitating device extending downwardly from said inner cover into said liquid receptacle, a hinged outer cover, a motor supported on said outer cover, a light also supported on said outer cover, a mutilated shade surrounding said light, an outer casing enclosing said motor, light and shade, driving connections intermediate said motor and said agitating device for actuating the latter, and driving connections operated by said motor for rotating said shade and said outer casing.

ABRAHAM S. LEVIN.